(12) United States Patent
Schimon

(10) Patent No.: US 9,360,184 B2
(45) Date of Patent: Jun. 7, 2016

(54) VEHICLE LIGHTING SYSTEM

(71) Applicant: Hella KGaA Hueck & Co., Lippstadt (DE)

(72) Inventor: Jaroslaw Schimon, Bielefeld (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 37 days.

(21) Appl. No.: 14/088,072

(22) Filed: Nov. 22, 2013

(65) Prior Publication Data
US 2014/0153275 A1  Jun. 5, 2014

(30) Foreign Application Priority Data

Nov. 30, 2012  (DE) .......................... 10 2012 111 638

(51) Int. Cl.
*F21S 8/10* (2006.01)
*B60Q 1/00* (2006.01)

(52) U.S. Cl.
CPC ............ *F21S 48/325* (2013.01); *B60Q 1/0041* (2013.01)

(58) Field of Classification Search
CPC ............................. B60Q 1/0041; F21S 48/325
USPC .......................................... 362/294, 373, 547
See application file for complete search history.

(56) References Cited

U.S. PATENT DOCUMENTS

| 2003/0112639 | A1* | 6/2003 | Stack ............................ 362/552 |
| 2010/0103691 | A1* | 4/2010 | Yasuda ............... F21S 48/1159 362/547 |
| 2011/0128752 | A1* | 6/2011 | Herbers et al. ................ 362/545 |
| 2012/0092885 | A1* | 4/2012 | Hong et al. .................... 362/547 |
| 2012/0161633 | A1* | 6/2012 | Nishitani et al. .............. 315/117 |

FOREIGN PATENT DOCUMENTS

| DE | 102004022836 A1 | 12/2005 |
| DE | 102011084312 A1 | 4/2012 |
| DE | 102011089983 A1 | 6/2012 |

* cited by examiner

*Primary Examiner* — Stephen F Husar
(74) *Attorney, Agent, or Firm* — Husch Blackwell LLP

(57) ABSTRACT

A vehicle lighting system includes first and second lighting devices. The first lighting device has a first opening, and the second lighting device has a second opening. The first opening provides access to a first installation space on the first lighting device, and the second opening provides access to a second installation space on the second lighting device. The first and second installation spaces are essentially mirror images of one another. A first fan unit is located at the first opening and a second fan unit is located at the second opening. The first and second fan units are essentially mirror images of one another.

9 Claims, 2 Drawing Sheets

VEHICLE LIGHTING SYSTEM

CROSS REFERENCE

This application claims priority to German Patent Application No. 10 2012 111638.5, filed Nov. 30, 2012.

TECHNICAL FIELD OF THE INVENTION

The invention relates to a vehicle lighting system.

BACKGROUND OF THE INVENTION

Document DE 10 2007 043 961 A1 describes a lighting device with a fan unit that allows air to be channeled into an installation space in the lighting device. Channeling air into the installation space in the lighting device serves to cool at least one light source located in said space in the lighting device. As at least two light sources are normally found on the front of a vehicle, for example, several fan units, i.e. at least one unit per installation space, are used. A problem that has emerged with this system, however, is that the characteristics of the airflow being introduced has to be simulated for each installation space of each lighting device. This requires considerable time/effort in simulating the kinematic parameters of each different installation space, in particular when identical fan units are employed.

SUMMARY OF THE INVENTION

The purpose of this invention is, therefore, to develop a vehicle lighting system featuring a first and a second lighting device that will allow the time and effort needed to analyse the kinematic parameters of the installation space in the first and in the second lighting device to be reduced.

In order to solve this task, a lighting system exhibiting the characteristics set out in patent claim 1 is proposed. Favored further developments of the invention are depicted in the dependent claims. The features described in the claims may be significant in terms of the invention either on their own or in combination with each other.

The invention discloses a vehicle lighting system featuring a first and a second lighting device. The first lighting device exhibits at least one opening, and the second lighting device at least a second opening. The first opening provides access to a first installation space on the first lighting device and the second opening provides access to a second installation space on the second lighting device. The first installation space and the second installation space are essentially mirror images of one another. A first fan unit is located at the first opening and a second fan unit at the second opening. The first fan unit and the second fan unit are essentially mirror images of one another. Prior to series production, the airflow characteristics of the installation spaces found in vehicle lighting devices are simulated in an elaborate procedure. The simulation entails an analysis of the kinematic parameters of the installation space within the lighting device. The de-icing characteristics of the lighting device are also analysed in this process. Simulating the airflow characteristics of the installation space within a vehicle lighting device can require several weeks of testing before the device is ready for series production. To this end, a fan unit demonstrating specific airflow characteristics is attached to the lighting device. The airflow characteristics of the fan unit are factored into the simulation of the airflow characteristics of the installation space within the vehicle lighting device. Usually, for reasons of cost, identical fan units are used for both the first and the second lighting device.

In order, however, to reduce considerably the time and effort involved in the simulation process, it makes sense if the installation space in the first lighting device containing the first fan unit is a mirror image of the installation space in the second lighting device containing the second fan unit. This means that the time and effort spent in simulating the airflow characteristics of the installation space in the second lighting device can be considerably reduced once the airflow characteristics of the first installation space in the first lighting device have been simulated. In the best case, a reduction by half can be achieved if the first installation space of the first lighting device containing the first fan unit is an exact mirror image of the second installation space in the second lighting device containing the second fan unit. In this case, the flow of air generated by the first fan unit through the first installation space of the first lighting device is identical to that generated by the second fan unit through the second installation space of the second lighting device. For this to happen, however, the first fan unit and the second fan unit must essentially be mirror images of one another. If the aim is to reduce the simulation effort by exactly one half, the first fan unit and the second fan unit must be exact mirror images of one another, and this must, by definition, apply also to the first and second installation spaces. If the installation spaces of the two lighting devices and the fan units they contain form symmetrical mirror images, the first opening can e.g. be freely selected without regard to the position of the second opening providing access to the second installation space, as the airflow characteristics of the first installation space combined with the airflow characteristics of the first fan unit are identical to the airflow characteristics of the second installation space combined with the airflow characteristics of the second fan unit.

Of particular advantage is the fact that the first lighting device and/or the second lighting device exhibit at least one air outlet area. Creating an air outlet area in the first and/or the second lighting device allows the air that has been channeled into the unit to be extracted selectively by the fan unit. This also affords the installation space in the lighting device protection against dust and moisture up to the first and/or second opening and the air outlet area. The air outlet area can exhibit various dimensions. Provided that the airflow through the first and/or second fan unit is constant, the air pressure in the installation space of the first and/or second lighting device can be managed by selecting a specific air outlet area. The smaller the air outlet area opposite the first and/or second opening, the greater the resulting air pressure in the installation space of the first and/or second lighting device. Increasing the air pressure within the installation space of the first and/or second lighting device compared with atmospheric pressure is an effective means of preventing moisture and/or dust from entering the unit via the air outlet area.

It is preferable also for the first and/or the second fan unit to be radial fans, as these units allow a greater increase in pressure compared with e.g. an axial fan. Radial fans with an air intake on one or both sides can be used. This allows high pressure to be generated with a relatively low volume of air. The air is sucked in axially, i.e. parallel to the drive axle of the radial fan, before being re-channeled in response to the 90° rotation of a centrifugal impeller, and then blown out radially. The entire airflow thus leaves the centrifugal impeller along the axle diameter. This gives the air molecules greater kinetic energy and produces greater air pressure than that created by an axial fan.

It is also preferable for the first fan unit and/or the second fan unit to have an electric motor that can be controlled by a fieldbus, in particular by a CAN bus. A fieldbus can transfer all the necessary information via two data lines. The electric motor can be connected to the fieldbus via a controller, which in turn, can receive data from a central computer processing unit. This enables the central processing unit to send data to the controller via the fieldbus, whereby, depending on the data it receives, the controller will switch the motor on or off (the simplest case). It would also be conceivable for the speed of the electric motor to be regulated via the controller. Use of a fieldbus helps to reduce considerably the amount of cabling required in the vehicle. Additional controllers can be connected to the same fieldbus which allows all the units to exchange data among one another. The failure of one controller does not compromise the functionality of the other units in the group.

It is also advantageous to install a sensor, in particular a temperature and/or a humidity sensor, on the first and/or second lighting device. The sensor can be connected to the fieldbus via a controller. The data forwarded by the sensor via the controller to the fieldbus can also be sent to a computer processing unit. The central processing unit can send data via the fieldbus to another controller to which the electric motor is connected. This allows the speed of rotation of the electric motor to be adjusted in response to temperature changes in the installation space of the first and/or second lighting device. To counteract extreme humidity in the installation space of the first and/or second lighting device, the first and/or second fan unit can be operated at maximum speed, as required. The speed of rotation of the electric motor can gradually be reduced when humidity levels in the installation space of the first and/or second lighting device begin to fall.

It is beneficial for the sensor to be connected to a computer processing unit via a wired or wireless data link. The advantage of the wired connection is that a data link between the sensor and the processing unit is available straight away. Also, other electrical components can be provided with power from the wired link. The advantage of the wireless connection is that there is no need for additional cabling for data transfer within the vehicle.

It is also preferable for the first fan unit and/or the second fan unit to exhibit at least one fastening element that serves to attach the first fan unit to the first lighting device and/or the second fan unit to the second lighting device. A strap eyelet on the fan unit can serve as fastening material. The fan unit can then be attached to the lighting device using a screw attachment. It would also be conceivable to use a locking latch that interacts with a complementary counter-agent on the lighting device. As with the screw attachment, this would allow a reversible connection to be established between fan unit and lighting device. It would also be conceivable, however, to attach the fan unit to the lighting device using conventional welding or bonding methods.

Of particular advantage is an elastic rubber element fitted to the first and/or second opening. The rubber element helps to dampen vibrations that can come from the fan unit. The rubber element can also act as a seal for the fan unit's air outlet area and the lighting device's opening. The rubber element can be attached to the opening via a welding procedure. However, autonomous sealing elements are also conceivable which can be replaced in the event of a defect. This obviously applies only if the fan unit has a reversible connection with the lighting device.

It is advantageous for the first and/or second installation space to feature at least one air duct, which can be used to control the flow of air. Since the lamps installed in the installation space of the lighting devices can reach very high temperatures, it is possible to direct air via the air duct onto the elements requiring cooling in said space. The air duct may also feature branches to allow air to be directed onto individual elements in the installation space of the lighting device. Notably, it would be conceivable to direct an airflow onto the lens of the lighting device to support the rapid de-icing of said lens.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
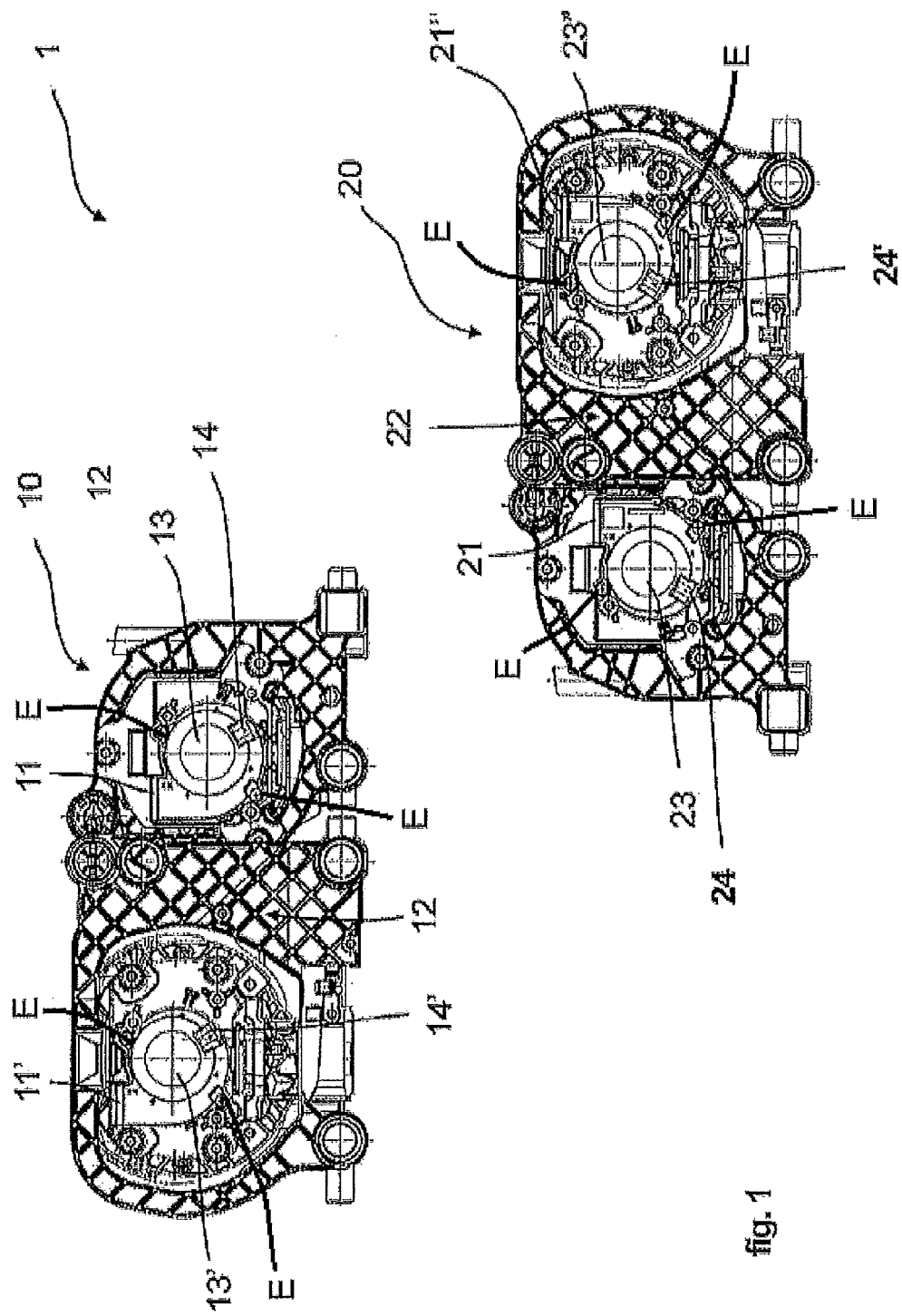
FIG. 1 Schematic view of a lighting system.

FIG. 1 depicts a vehicle lighting system (1) with a first lighting device (10) and a second lighting device (20). The first lighting device (10) exhibits a first fan unit (13) mounted on said first lighting device (10) via a screw attachment. The first fan unit (13) can be attached to the first lighting device (10) also via a welded or bonded (glued) connection. Lighting device (10) exhibits a first opening (11) where the air outlet area of the first fan unit (13) is located. An elastic element can be used at this join in order to ensure that vibrations caused by the first fan (13) are dampened by the time they arrive at the lighting device (10). As such, it would also be conceivable to mount the first fan unit (13) on the first lighting device (10) on spring elements in order to dampen any vibration caused by said unit.

The first fan unit (13) exhibits an electrical contact element (14) via which an electric motor (M) of said first fan unit (13) can be connected to a controller (C). In turn, the controller (C) can be connected via a fieldbus (F) to, in particular, a CAN bus. The first lighting device (10) exhibits another first fan unit (13'), whereby the air outlet area of said other first fan unit (13') is located at another first opening (11'). The other first fan unit (13') also has an electrical contact element (14'). The second lighting device (20) is installed as a perfect mirror image of the first lighting device (10). As such, the second lighting device (20) exhibits a second fan unit (23) mounted on said second lighting device (20) via a screw attachment. It is preferable for the first fan unit (13) and/or the second fan unit (23) to exhibit at least one fastening element (E) that serves to attach the first fan unit (13) to the first lighting device (10) and/or the second fan unit (23) to the second lighting device (20). The air outlet area of the second fan unit (23) is located at a second opening (21). Here too, fan unit (23) exhibits an electrical contact element (24). The second lighting device (20) also has another second fan unit (23'), whereby the air outlet area of said other second fan unit (23')

is located at a further second opening (21'). The other second fan unit (23') also has an electrical contact element (24'). Thus, the second lighting device (20) exhibits exactly the same airflow characteristics as the first lighting device (10). Since the second installation space in the second lighting device (20), the former being located behind a second housing element (22), is a precise mirror image of the space in the first lighting device (10), the simulated airflow results gleaned from the installation space in the first lighting device (10), the former being located behind a first housing element (12), can be used to describe the airflow characteristics found in the second installation space in the second lighting device (20). In this case, therefore, the time and effort required for the simulation process would be reduced by a half.

Figure 2:
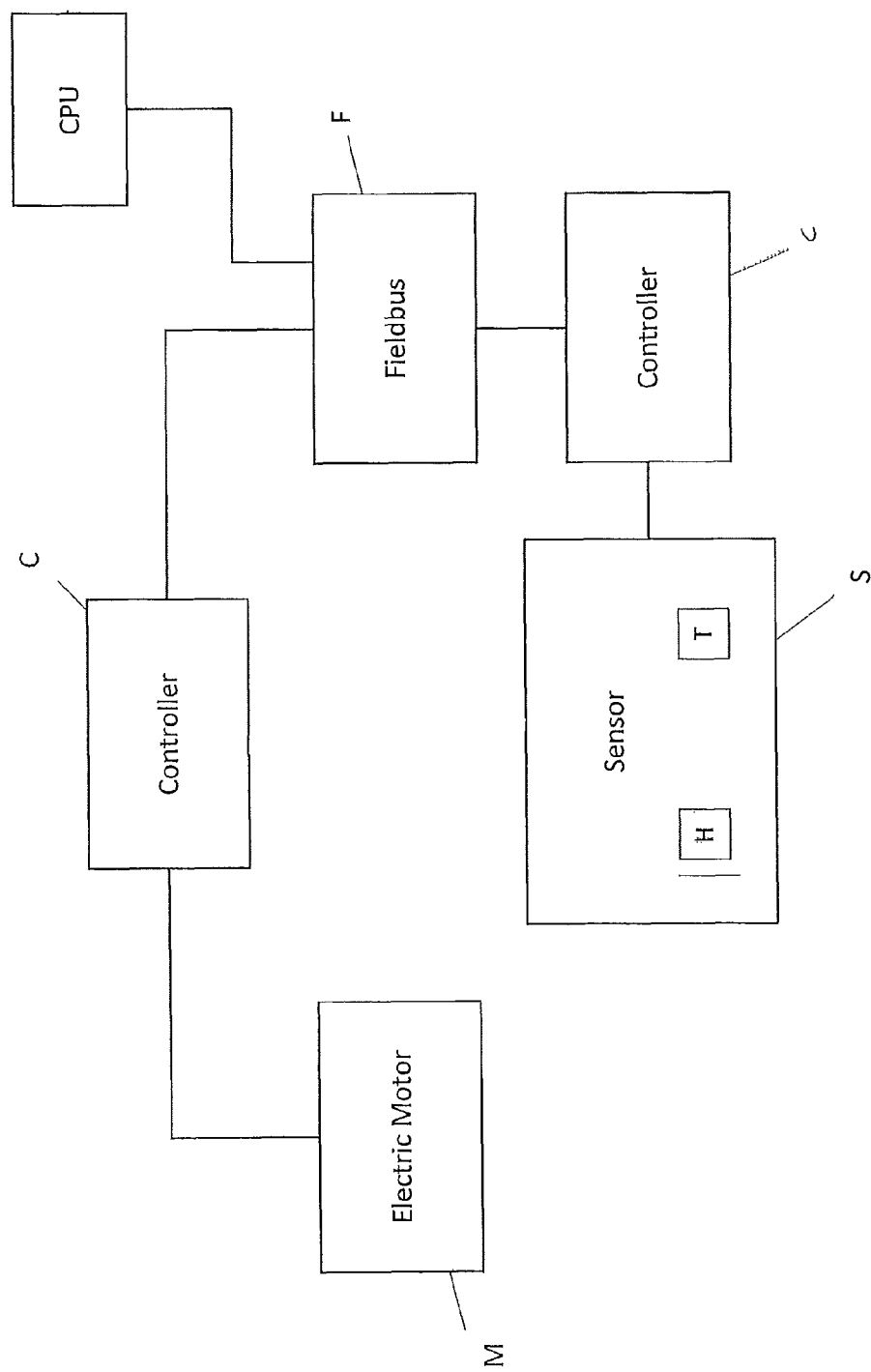
FIG. 2 Schematic view of the communication system of the lighting system of FIG. 1.

It is also advantageous to install a sensor (S), in particular a temperature (T) and/or a humidity (H) sensor, on the first lighting device (10) and/or second lighting device (20), as shown in FIG. 2. The sensor (S) can be connected to the fieldbus (F) via a controller (C).

LIST OF REFERENCE SIGNS

1 Lighting system
10 First lighting device
11 First opening
12 First housing element
13 First fan unit
14 Electrical contact element
20 Second lighting device
21 Second opening
22 Second housing element
23 Second fan unit
24 Electrical contact element
Fastening Element
C Controller
M Electric Motor
F Fieldbus
S Sensor
H Humidity Sensor
T Temperature Sensor

The invention claimed is:

1. A vehicle lighting system comprising:
a first and a second lighting device, said first lighting device having at least a first opening and said second lighting device having at least a second opening, wherein said first lighting device is mounted on the right side of a vehicle, and the second lighting device is mounted on the left side of a vehicle;
wherein the first opening provides access to a first installation space on the first lighting device and the second opening provides access to a second installation space on the second lighting device, wherein the first installation space and the second installation space are mirror images of one another; and
a first fan unit located at the first opening and a second fan unit located at the second opening, wherein the first fan unit and the second fan unit are mirror images of one another;
wherein at least one of the first fan unit or the second fan unit further comprises an electric motor controlled by a fieldbus.

2. The vehicle lighting system pursuant to claim 1, wherein at least one of the first lighting device or the second lighting device exhibit at least one air outlet area.

3. The vehicle lighting system pursuant to claim 1, wherein at least one of the first fan unit or the second fan unit is a radial fan.

4. A vehicle lighting system comprising:
a first and a second lighting device, said first lighting device having at least a first opening and said second lighting device having at least a second opening, wherein said first lighting device is mounted on the right side of a vehicle, and the second lighting device is mounted on the left side of a vehicle;
wherein the first opening provides access to a first installation space on the first lighting device and the second opening provides access to a second installation space on the second lighting device, wherein the first installation space and the second installation space are mirror images of one another; and
a first fan unit located at the first opening and a second fan unit located at the second opening, wherein the first fan unit and the second fan unit are mirror images of one another; and
a humidity sensor located on at least one of the first lighting device or the second lighting device.

5. The vehicle lighting system pursuant to claim 4, wherein the sensor is connected to a computer processing unit via a wired or wireless data link.

6. The vehicle lighting system pursuant to claim 1, wherein at least one of the first fan unit or the second fan unit further comprises at least one fastening element that serves to attach the first fan unit to the first lighting device or the second fan unit to the second lighting device.

7. The vehicle lighting system pursuant to claim 1, wherein at least one of the first installation space or the second installation space feature at least one air duct.

8. The vehicle lighting system pursuant to claim 1, wherein said electric motor is controlled by a CAN bus.

9. The vehicle lighting system pursuant to claim 4, wherein said sensor is a temperature sensor.

* * * * *